(12) United States Patent
Davis et al.

(10) Patent No.: US 9,929,876 B2
(45) Date of Patent: Mar. 27, 2018

(54) ADAPTABLE MULTI-MODE WIRELESS POWER, LIGHT AND AUTOMATION

(71) Applicant: Kortek Industries Pty Ltd, Brisbane (AU)

(72) Inventors: Barrie Davis, Sanctuary Cove (AU); Benjamin Davis, Alderley (AU)

(73) Assignee: Kortek Industries Pty Ltd, Brisbane (AU)

( * ) Notice: Subject to any disclaimer, the term of this patent is extended or adjusted under 35 U.S.C. 154(b) by 0 days.

(21) Appl. No.: 15/032,313

(22) PCT Filed: Oct. 28, 2014

(86) PCT No.: PCT/AU2014/001007
§ 371 (c)(1),
(2) Date: Apr. 27, 2016

(87) PCT Pub. No.: WO2015/061831
PCT Pub. Date: May 7, 2015

(65) Prior Publication Data
US 2016/0277202 A1  Sep. 22, 2016

(30) Foreign Application Priority Data
Oct. 29, 2013 (AU) ................ 2013904180

(51) Int. Cl.
*G05B 11/01* (2006.01)
*H04L 12/28* (2006.01)
(Continued)

(52) U.S. Cl.
CPC ........ *H04L 12/283* (2013.01); *H04L 12/2809* (2013.01); *H04L 67/125* (2013.01);
(Continued)

(58) Field of Classification Search
CPC ... H04L 12/28; H04L 12/282; H04L 41/0246; H04L 41/08; H04L 67/025; H04L 67/104; H04L 67/125
(Continued)

(56) References Cited

U.S. PATENT DOCUMENTS 5,909,183 A    6/1999  Borgstahl et al.
6,585,596 B1 * 7/2003  Leifer ............... A63F 13/06
                                            345/156
(Continued)

FOREIGN PATENT DOCUMENTS

CN   102612214     7/2012
WO   2005084339    9/2005
(Continued)

OTHER PUBLICATIONS

HomeTheaterForum: "Logitech Harmony Link Review Part 1 of 2)", https://www.youtube.com/watch?v=NGIE-zF7Rg0, uploaded Feb. 13, 2012.
(Continued)

*Primary Examiner* — Carlos E Garcia
(74) *Attorney, Agent, or Firm* — Eagar & Martin Pty Ltd

(57) ABSTRACT

A device and method for remotely controlling the supply of electricity to a lighting element The device (200) includes a wireless communications module (202) configured for peer-to-peer communications and a microcontroller (208). The electrical supply is varied based on a command received through the wireless communications module that may include specifying one or more particular LEDs in order to generate a spectrum of different colors from the lighting element.

19 Claims, 3 Drawing Sheets

(51) Int. Cl.
*H04L 29/08* (2006.01)
*H04W 4/00* (2018.01)
*H04W 76/02* (2009.01)
*H04L 29/06* (2006.01)

(52) U.S. Cl.
CPC ............ *H04L 67/141* (2013.01); *H04L 69/24* (2013.01); *H04W 4/008* (2013.01); *H04W 76/023* (2013.01); *H04L 2012/2841* (2013.01)

(58) Field of Classification Search
USPC ...... 340/4.42, 539.1, 539.11, 539.14; 3/4.42, 3/539.1, 539.11, 539.14
See application file for complete search history.

(56) References Cited

U.S. PATENT DOCUMENTS

| | | | | |
|---|---|---|---|---|
| 7,024,501 | B1* | 4/2006 | Wright | A63F 13/02 710/14 |
| 7,964,989 | B1* | 6/2011 | Puschnigg | G06F 1/266 307/116 |
| 8,290,515 | B2 | 10/2012 | Staton | |
| 9,319,234 | B2* | 4/2016 | Davis | H04L 12/2803 |
| 9,465,377 | B2 | 10/2016 | Davis | H04L 12/12 |
| 2001/0027089 | A1* | 10/2001 | Salam | H04B 1/3838 455/569.1 |
| 2003/0177187 | A1* | 9/2003 | Levine | A63F 13/10 709/205 |
| 2005/0096753 | A1* | 5/2005 | Arling | G05B 15/02 700/11 |
| 2005/0174962 | A1 | 8/2005 | Gurevich et al. | |
| 2005/0179545 | A1* | 8/2005 | Bergman | G08B 13/08 340/545.2 |
| 2005/0219208 | A1 | 10/2005 | Eichenberger et al. | |
| 2006/0028997 | A1 | 2/2006 | McFarland | |
| 2006/0109102 | A1* | 5/2006 | Gortz | H04M 1/6505 340/531 |
| 2007/0263600 | A1* | 11/2007 | Sutardja | H04M 1/72533 370/352 |
| 2007/0290793 | A1 | 12/2007 | Tran | |
| 2007/0293208 | A1* | 12/2007 | Loh | H04L 12/282 455/419 |
| 2008/0143493 | A1 | 6/2008 | Nam et al. | |
| 2008/0218148 | A1 | 9/2008 | Robertson et al. | |
| 2009/0004907 | A1* | 1/2009 | Goldman | H01R 31/065 439/387 |
| 2009/0058635 | A1 | 3/2009 | LaLonde et al. | |
| 2009/0106042 | A1* | 4/2009 | Maytal | G06Q 30/018 705/317 |
| 2009/0284075 | A1* | 11/2009 | Yeh | H02J 3/14 307/64 |
| 2009/0315701 | A1* | 12/2009 | Anderson | G08B 21/04 340/539.1 |
| 2009/0316671 | A1 | 12/2009 | Rolf et al. | |
| 2010/0031295 | A1 | 2/2010 | Krzyzanowski | |
| 2010/0165879 | A1 | 7/2010 | Gupta et al. | |
| 2010/0271802 | A1 | 10/2010 | Recker et al. | |
| 2010/0297941 | A1 | 11/2010 | Doan et al. | |
| 2011/0026504 | A1* | 2/2011 | Feinberg | H04W 4/08 370/338 |
| 2011/0050451 | A1* | 3/2011 | Mierta | G08C 17/02 340/12.22 |
| 2011/0065458 | A1* | 3/2011 | Staton | G08C 17/00 455/456.6 |
| 2011/0082939 | A1* | 4/2011 | Montemurro | H04W 76/023 709/227 |
| 2011/0173313 | A1 | 7/2011 | Owhadi et al. | |
| 2011/0225305 | A1 | 9/2011 | Vendantham et al. | |
| 2011/0243151 | A1* | 10/2011 | Diab | H04L 12/4625 370/463 |
| 2011/0311052 | A1 | 12/2011 | Myers et al. | |
| 2012/0127935 | A1* | 5/2012 | Josiam | H04W 72/121 370/329 |
| 2012/0184330 | A1* | 7/2012 | Sun | H04W 72/1215 455/553.1 |
| 2012/0271904 | A1* | 10/2012 | Black | H04L 67/06 709/213 |
| 2012/0322376 | A1* | 12/2012 | Couse | H04M 1/7253 455/41.2 |
| 2013/0077531 | A1* | 3/2013 | Chu | H04W 88/06 370/255 |
| 2013/0142181 | A1 | 6/2013 | Makim et al. | |
| 2013/0173811 | A1 | 7/2013 | Ha et al. | |
| 2013/0309968 | A1* | 11/2013 | Suzuki | H04W 4/008 455/41.1 |
| 2014/0244044 | A1 | 8/2014 | Davis et al. | |
| 2014/0244045 | A1 | 8/2014 | Davis et al. | |
| 2014/0244063 | A1* | 8/2014 | Davis | H05B 37/0272 700/297 |
| 2015/0056979 | A1 | 2/2015 | Davis et al. | |
| 2015/0109956 | A1* | 4/2015 | Chu | H04L 12/12 370/254 |
| 2015/0287041 | A1 | 10/2015 | Davis et al. | |

FOREIGN PATENT DOCUMENTS

| | | |
|---|---|---|
| WO | 2013015656 A2 | 1/2013 |
| WO | 2013067569 A1 | 5/2013 |

OTHER PUBLICATIONS

"Mixed-Mode WLAN: Integration of Ad Floc Mode with Wireless LAN infrastructure" IEEE GLOBECOM 2003, pp. 231-235, Chen et al.

English Translation of the Specification of CN 102612214, published Jul. 25, 2012.

Extended European Search Report issued on corresponding European application EP 14858596.1.

* cited by examiner

ADAPTABLE MULTI-MODE WIRELESS POWER, LIGHT AND AUTOMATION

CROSS REFERENCE TO RELATED APPLICATIONS

This application claims the benefit of Australian Provisional Application No. 2013904180, filed 29 Oct. 2013. This application is related to U.S. Provisional Application No. 61/786,519, filed 15 Mar. 2013; and Australian Patent Application No. 2013204671, filed 12 Apr. 2013. The entire contents of each of the above-identified applications is hereby incorporated by reference herein.

FIELD OF INVENTION

The present disclosure relates to the control of mains power, lighting and automation in domestic and commercial applications using standard portable computing devices such as smartphones, tablets, laptop/notebook/netbook/ultrabook computers and similar items to act as a personal controller utilizing an adaptable wireless communications link.

BACKGROUND OF THE INVENTION

Many residential and commercial buildings have electrical power, lights, doors, gates, shutters, awnings, blinds and other mechanisms that can be operated or programmed using buttons, switches or remote controls. Current methods of wireless control involve handheld devices that typically use sub-1 GHz technologies to send open/close, on/off, or other commands to a receiver integrated into the main mechanism of a device. On receiving a remote control command, the mechanism may, amongst other actions, open or close a door, raise or lower a blind, turn lights on or off, or vary the flow of power.

In recent years, the proliferation of smartphones has placed powerful computing devices in the hands of the public. While these devices can generate and transmit wireless control commands, their generic wireless systems are not compatible with the standards currently used in domestic or commercial appliances and mechanisms, so they cannot natively communicate with such in order to transfer programming or control commands.

It can be appreciated that manufacturers of controllable power, door, gate, shutter, awning, fan, blind and light mechanisms may find it highly advantageous for customers to control or program various aspects of their products natively from a smartphone.

SUMMARY

In one exemplary embodiment, the present disclosure includes two parts: a power control unit with adaptable wireless communication capabilities; and a battery powered personal controller able to communicate with a power control unit via a wireless communications link. It will be appreciated that reference herein to "preferred" or "preferably" is intended as exemplary only.

The power control unit is preferably configured to wirelessly operate: as an adaptable Wi-Fi Direct and network Wi-Fi device, either individually or concurrently, using Wi-Fi-Direct and/or network Wi-Fi technologies; and optionally as a Bluetooth device using Bluetooth SIG class 2.1+EDR or later technologies including Bluetooth Low Energy, Bluetooth 4.0 and protocol layers such as CSRMesh. As used herein, "network Wi-Fi" refers to the Wi-Fi Alliance definition as any "wireless local area network (WLAN) products that are based on the Institute of Electrical and Electronic Engineers (IEEE) 802.11 standards" including any amendments, extensions or proprietary implementations. As used herein, the term "Wi-Fi Direct" refers to a device configured to support the Wi-Fi Alliance Wi-Fi Direct specification and amendments, extensions or proprietary implementations of Wi-Fi peer-to-peer technology.

Wi-Fi Direct and Bluetooth are peer-to-peer capable communication technologies. Peer-to-peer communication methods and control aspects that may be incorporated into the power control unit are described in more detail in PCT Application No. PCT/AU2011/001666, filed Dec. 29, 2011, titled "Wireless Power, Light and Automation Control," the entire disclosure of which is incorporated herein by reference. Network Wi-Fi is a communication technology that allows devices to communicate through a WLAN. Adaptable network, peer-to-peer communication methods and system attributes that may be incorporated into the power control unit are described in more detail in PCT Application No. PCT/AU2012/000959, filed Aug. 15, 2012, titled "Adaptable Wireless Power, Light and Automation System" the entire disclosure of which is incorporated herein by reference.

The personal controller is preferably a commercially available cellular or mobile phone commonly known as a smartphone that supports at least network Wi-Fi and may also support Wi-Fi Direct and/or Bluetooth and/or Near Field Communications (NFC). Unless otherwise noted, the personal controller will be described in terms of a smartphone, though the disclosure is not so limited. For example only, the personal controller may be any portable device which can download or install by other means an Applications Program (App), have a suitable interface the user can interact with to control the App in order to execute required functions, and have the wireless communications capability to establish communications with a power control unit. Examples of personal controllers include smartphones, tablets, laptops, ultrabooks and notebook personal computers.

The power control unit can preferably form a communications link with a smartphone using Wi-Fi Direct and/or network Wi-Fi. It can be appreciated that when the power control unit is connected to a WLAN, a smartphone with Wi-Fi capability connected to the same WLAN can use an appropriate App to communicate with the power control unit. That is, a user can enter a command into their smartphone and send it to the power control unit via the WLAN. In this case the smartphone could be in the vicinity of the WLAN access point, or the smartphone could be at a remote location and communicate with the WLAN access point via the Internet if so configured.

It can be appreciated that a power control unit operating in Wi-Fi Direct mode can communicate peer-to-peer with a smartphone without the requirement of a WLAN. In this case, the power control unit preferably simulates a Wi-Fi access point or operates as a software access point (softAP) if the smartphone is not using Wi-Fi Direct to communicate; or if the smartphone is using Wi-Fi Direct to communicate, the power control unit and smartphone can negotiate which device will assume the Wi-Fi Direct group owner role and establish a peer-to-peer connection. Once a peer-to-peer connection has been established, the user is able to send commands directly from a smartphone to the selected power control unit without the need for any other intermediary or network.

The present disclosure in one preferred embodiment sets forth a power control unit with wireless communication capabilities derived from any number of radios, transceivers and controllers that provide both a network Wi-Fi and Wi-Fi Direct connection individually or concurrently. In some preferred embodiments, the power control unit may also include the necessary radios, transceivers or components to support a wireless Bluetooth connection.

Depending on cost and desired outcome, the wireless communication capabilities of the power control unit may be achieved by using: any number of discrete radios, aerials, transceivers, microprocessors and controllers either individually, collectively, or as a system in a package (SiP) or as a system on a chip (SoC); a combination or "combo" chip that aggregates the functionality of a number of discrete transceivers and controllers of different standards as a SiP or SoC; or using any combination of combo chip/s, SiP/s, SoC/s and/or discrete radios, aerials, transceivers and controllers. The power control unit may utilize single or multiple wireless bands, physical channels, virtual channels, modes or other coexistence technologies and algorithms, the methods of which are already known to those of ordinary skill in the art and are not described herein. Depending on the chosen hardware components, the power control unit may also include shared antenna support and shared signal receiving paths to eliminate the need for an external splitter or reduce the number of aerials required.

The present disclosure in one preferred embodiment sets forth a power control unit with wireless communications that in a first mode provide a peer-to-peer connection and in a second mode can be configured by the user to operate as a network Wi-Fi device and connect to a WLAN as a client.

The power control unit has its wireless communications set to initially function in peer-to-peer mode, preferably utilizing Wi-Fi Direct, irrespective of its final configuration. Because Wi-Fi Direct provides a peer-to-peer connection, as soon as power is applied to power control unit, it can be recognised by a smartphone communicating with at least network Wi-Fi and a wireless communications link can be established. A smartphone App is preferably used to configure any operational aspects and control the functional capabilities of the power control unit. Once a communications link is established, the user is able to activate a smartphone App which preferably uses the data path between the smartphone and power control unit. Using a smartphone App, the user can choose if the power control unit is to continue running in peer-to-peer mode, swap to network Wi-Fi mode, or run both modes concurrently where supported, and set the power control unit with any operational parameters required for a network Wi-Fi or peer-to-peer device, name the device, set an encryption key, enter a password and any other requirements that may be required or desirable. When this procedure has been completed, the user can command the power control unit to "restart", at which time it will configure itself according to the parameters which have been specified during the setup process.

If the user has chosen the power control unit to operate in peer-to-peer mode utilizing Wi-Fi Direct, it would continue to do so after the restart. The power control unit would only connect to smartphones that can fully comply with its connection requirements before establishing a communications link. This may include security measures in addition to any native security measures of Wi-Fi Direct such as Wi-Fi Protected Access or Wi-Fi Protected Access 2.

If the user has chosen the power control unit to operate in a network Wi-Fi mode, the smartphone App would configure the necessary parameters for the power control unit to connect to a WLAN. When the power control unit restarts, it would connect as a client device on the WLAN. It would then preferably be accessible to devices which are also connected to the same WLAN. A peer-to-peer wireless mode of the power control unit is preferably used to configure the necessary parameters for the access administrator to connect to a WLAN as a client.

In either mode, a smartphone App is preferably used to control the functional capabilities of the power control. In network W-Fi mode, the smartphone App communicates with the selected power control unit via a WLAN access point. In peer-to-peer mode utilizing Wi-Fi Direct, the smartphone App communicates directly with the selected access administrator machine to machine.

If the user has chosen the power control unit to operate in both Wi-Fi Direct mode and network Wi-Fi mode concurrently, when the power control restarts it would appear as a client device on the WLAN and as a Wi-Fi Direct access point/group participant with the functionality of each mode being available. In that way, and as an example only, a power control unit could allow third party access via a Wi-Fi Direct connection without allowing access to the concurrent WLAN connection, thus preventing access to other WLAN devices.

In addition to configuring the operational aspects of the power control unit, a smartphone App would also preferably be used to control and program various automation and interactive functions of the power control unit. In one preferred embodiment this could include the ability to set a specific response to an ambient light threshold determined from an embedded ambient light sensor in the power control unit. In another preferred embodiment, this could include the ability to set a specific response in relation to a proximity event determined from an embedded proximity detector in the power control unit. In another preferred embodiment this could include specifying a colour hue from a graphical approximation displayed on the smartphone screen.

In one preferred embodiment, a Bluetooth peer-to-peer connection between a smartphone and power control unit may be used to enter information for configuration of the power control unit as a network Wi-Fi device and/or Wi-Fi Direct access point/group participant and/or peer-to-peer Wi-Fi device, or to facilitate the establishment of a network Wi-Fi connection and/or Wi-Fi Direct connection and/or peer-to-peer Wi-Fi connection. In another preferred embodiment, a Bluetooth connection between a power control unit and smartphone may be used as a peer-to-peer communication channel to exchange data with a power control unit.

The power control unit may have an exposed human interface such as a mechanical switch(es), button(s), or capacitive/proximity touch area(s). In one preferred embodiment, it may be desirable to have no exposed human interface in order to reduce the incidence of vandalism or create a highly weather resistant unit.

It can be appreciated that the power control unit can be incorporated into many different forms of lighting products.

In one preferred aspect, the present disclosure sets forth a device for linking a personal controller to a lighting element, the personal controller having a processor, a user interface, and a wireless communications transceiver. The device includes a wireless communications module operable for secure two-way wireless communication with the personal controller, the wireless communications module including an aerial and a radio transceiver, the wireless communications module being configured to communicate with the personal controller selectively using a non-peer-to-peer communications link and a peer-to-peer communications link established by simulating a network access point. The device further includes a microcontroller configured to operate the wireless communications module in more than one mode, the microcontroller being configured to operate the wireless communications module in a first mode using a peer-to-peer communications standard, the microcontroller being configured to operate the wireless control module in a second mode using a non-peer-to-peer communications standard, the microcontroller being programmed to use the first mode to communicate with the personal controller and receive network parameters of an available WLAN from the personal controller, the microcontroller being configured to use the network parameters of the available WLAN received from the personal controller to operate the wireless communications module in the second mode as a client on the WLAN. The device further includes a power control circuit configured to implement a command from the microcontroller to vary the supply of electricity to the lighting element based at least in part on instructions communicated from the personal controller.

In another preferred aspect, the present disclosure sets forth a device for linking a personal controller to a lighting element, the personal controller having a processor, a user interface, and a wireless communications transceiver. The device includes a wireless communications module operable for secure two-way wireless communication with the personal controller, the wireless communications module including an aerial and a radio transceiver, the wireless communications module being configured to communicate with the personal controller using a peer-to-peer communications link established by simulating a network access point. The device further includes a microcontroller configured to obtain network parameters of a WLAN from the personal controller using the peer-to-peer communications link established between the wireless communications module and the personal controller, the microcontroller being programmed to operate the wireless communications module as a client of the WLAN based on the network parameters obtained from the personal controller through the peer-to-peer communications link. The device also includes a power control circuit configured to implement a command from the microcontroller to vary the supply of electricity to the lighting element based at least in part on instructions communicated from the personal controller.

In another preferred aspect, the present disclosure sets forth a method for linking a smartphone to a lighting element. The method includes providing a power control unit physically connectable to a power circuit configured to operate the lighting element, the power control unit including a microprocessor and a radio transceiver operable for establishing a peer-to-peer communications link with the smartphone; establishing a wireless peer-to-peer connection between the power control unit and the smartphone by operating the power control unit as a simulated access point; determining, with the smartphone, whether the power control unit is configured as a client in a WLAN within range of the power control unit; and configuring the power control unit as a client of the WLAN if the power control unit is not already configured as a client.

The reference to any prior art in this specification is not, and should not be taken as an acknowledgement or any form of suggestion that the prior art forms part of the common general knowledge in Australia or in any other country.

DETAILED DESCRIPTION OF THE DRAWINGS

Alternative embodiments of the disclosure will be apparent to those skilled in the art from consideration of the specification and practice of the disclosure disclosed herein. It is intended that the specification and examples be considered as exemplary only, with a true scope and spirit of the disclosure being indicated by the claims which follow.

Figure 1:
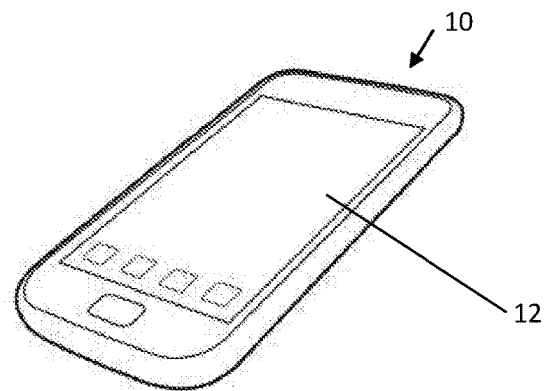
FIG. 1 is a perspective view of a smartphone for use in one preferred embodiment of the present disclosure.

FIG. 1 is a perspective representation of a smartphone 10 which uses a wireless link to communicate with a power control unit (described in more detail below). Smartphone 10 is preferably a commercially available, conventional smartphone. Some of the basic functions the smartphone preferably includes are: a touch sensitive graphical screen interface 12; a compatible radio transceiver; and the ability to run an application program, hereby termed a "Product App", specific to the individual smartphone and/or power control unit. It will be understood that the Product App is always used in combination with one or more processors, and where it is hosted, configures what might otherwise be a general purpose processor into a special purpose processor according to the functions and parameters of the Product App. The Product App may reside in a non-transitory medium such as the processor of a mobile communications device such as a smartphone, in a microprocessor of a power control device, in a remote, offsite processor, or shared among devices or systems. Preferably, the Product App is downloaded to smartphone 10 and operates as a human interface for the control, configuration, programming and/or interrogation of a power control unit. In the examples that follow, specific coding for the Product App has been omitted for simplicity as a person of ordinary skill in the art would be able to understand and reproduce the functionality of the described embodiments without the need for a discussion on particular coding.

Smartphone 10 is preferably configured to operate across a range of wireless communications technologies, including the technology to communicate via at least network Wi-Fi. Smartphone 10 may additionally include capability for Wi-Fi Direct and/or Bluetooth and/or NFC. While preferred embodiments of the present disclosure use a smartphone as its controller, and specifically a smartphone incorporating at least network Wi-Fi, other wireless communications methods and systems could be used depending on the specific requirements of the application of the disclosure.

Figure 2:
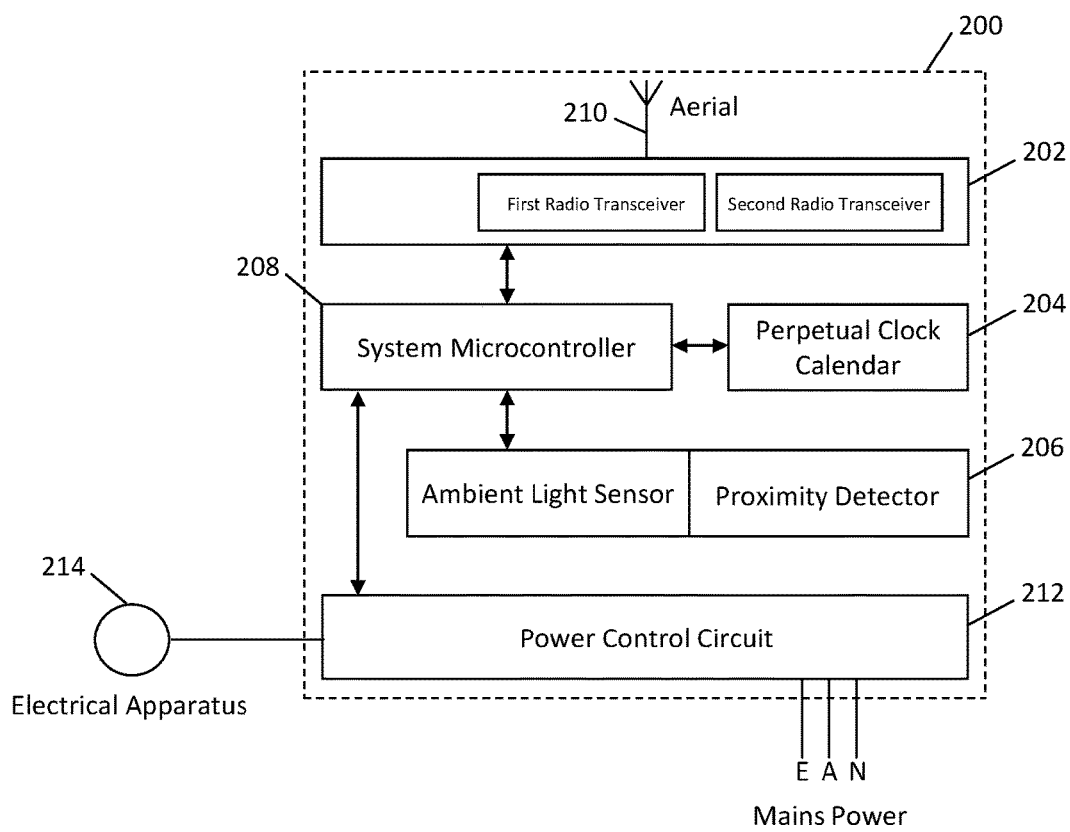
FIG. 2 is a block diagram of the functional elements of a power control unit in accordance with one preferred embodiment of the present disclosure.

Referring now to FIG. 2, a power control unit 200 is shown in accordance with a preferred embodiment of the present disclosure. Power control unit 200 has wireless communications 202, perpetual clock calendar 204, sensor module 206, system microcontroller 208 with embedded memory, an aerial 210, power control circuit 212 and electrical apparatus 214. In some preferred embodiments, it may be preferable for system microcontroller 208 to support external memory in addition to, or instead of, embedded memory. In some preferred embodiments, it may be preferable for system microcontroller 208 and communications module 206 to be fully integrated.

Perpetual clock calendar 204 preferably includes a power backup by the way of a battery or super capacitor enabling real time to be accurately maintained in instances where a mains power outage occurs. In some preferred embodiments, perpetual clock calendar 204 may be omitted where power control unit 200 does not perform any clock or date dependant operations or receives clock data from an external source via wireless communications. In some preferred embodiments, perpetual clock calendar 204 may be integrated into system microcontroller 208.

Power control circuit 212 is preferably adapted to vary the electrical power to an electrical device 214 and includes a suitable physical connection interface. Depending on the application, electrical device 214 may not necessarily be co-located with power control circuit 214. In one preferred embodiment, power control unit 200 may be wholly integrated into an electrical device such as, by way of example, door mechanisms, gate mechanisms, motorized blind and awning mechanisms, motorized screen mechanisms, light switches, lighting controllers, lighting fixtures, lamps, luminaries, power control mechanisms, power outlets, fans, climate control equipment such as thermostats and air conditioning units, vending machines, sprinkler and watering systems, pumps, pool filtration systems, gas metering and control equipment, electricity meters, peripheral computer equipment, consumer electronics, whitegoods, and alarm systems.

In one preferred embodiment, power control unit 200 preferably includes a suitable physical interface, such as terminal block, allowing power control unit 200 to be directly integrated into the electrical mains of a building or structure, or the electrical system of a vehicle or boat. In one preferred embodiment, power control unit 200 may be configured with a flying lead compatible with the NEMA 5-15 North American mains power standard in order to plug into a mains power general purpose outlet. In another preferred embodiment, power control unit 200 may be configured as a plug in pack with integrated power pins compatible with the NEMA 5-15 North American mains power standard in order to plug directly into a mains power general purpose outlet. It will be appreciated that power control unit may be configured according to the current, voltage and power pin requirements of various countries or applications without departing from the scope of the present disclosure.

The commands and responses between system microcontroller 208 and smartphone 10 are communicated through a radio frequency wireless link supported by wireless communications 202 and aerial 210. Wireless communications 202 preferably includes any number of radios, transceivers, microprocessors, controllers and aerials that provide a network Wi-Fi and Wi-Fi Direct connection individually or concurrently, with the ability to optionally support Bluetooth. Examples of wireless communications are described in PCT Application No. PCT/AU2012/000959, filed Aug. 15, 2012, the entire contents of which is incorporated by reference herein. Depending on cost and the desired operational functions, wireless communications 202 may include only a Wi-Fi radio, a combination of Wi-Fi radios, or any combination of: Wi-Fi Radio/s, wireless radio/s and a Bluetooth radio. The wireless communication capabilities may be achieved by using: any number of discrete radios, aerials, transceivers, microprocessors and controllers either individually, collectively, or as a system in a package (SiP) or as a system on a chip (SoC); a combination or "combo" chip that aggregates the functionality of a number of discrete transceivers and controllers of different standards as a SiP or SoC; or using any combination of combo chip/s, SiP/s, SoC/s and/or discrete radios, aerials, transceivers and controllers. The power control unit may utilize single or multiple wireless bands, physical channels, virtual channels, modes or other coexistence technologies and algorithms, the methods of which are already known to those of ordinary skill in the art and are not described herein. Depending on the chosen hardware components, wireless communications 202 may also include shared antenna support and shared signal receiving paths to eliminate the need for an external splitter or additional aerials. If desired, an additional aerial or aerials may be added where shared antenna support is not feasible.

When wireless communications 202 operates using a peer-to-peer Wi-Fi standard, preferably Wi-Fi Direct, it can communicate with devices that support network Wi-Fi or Wi-Fi Direct on a peer-to-peer basis without the need for any intermediary hardware. Wireless communications 202 is preferably configured to operate according to the Wi-Fi Direct specification as both a Wi-Fi Direct group participant and Wi-Fi Direct access point or SoftAP, allowing the power control unit 200 to appear to devices communicating with network Wi-Fi as a Wi-Fi access point. Through a SoftAP, wireless communications 202 is able to establish a peer-to-peer communications link with a network Wi-Fi device even though the network Wi-Fi device may not support Wi-Fi Direct. In this instance, a device using network Wi-Fi to communicate will receive a device discovery message from power control unit 200 as if from a Wi-Fi access point and be able to establish a peer-to-peer communications link with power control unit 200 as though it were connecting to a Wi-Fi access point. The procedure of establishing a communications link between a Wi-Fi Direct device and network Wi-Fi devices are defined in the Wi-Fi Alliance specifications and would be understood by practitioners skilled in communications systems protocols.

Wi-Fi Direct has a number of advantages which simplify communications between a power control unit and a smartphone operating as a controller. Significant advantages include mobility and portability, where a smartphone and power control unit only need to be within radio range of each other to establish a wireless communications link. Wi-Fi Direct offers secure communications through means such as Wi-Fi Protected Access 2 protocols and encryption for transported messages, ensuring the system remains secure to qualified devices. Most importantly, Wi-Fi Direct allows a smartphone with only network Wi-Fi to engage in peer-to-peer data exchange with a power control unit even though the smartphone network Wi-Fi was never intended to support on-demand, peer-to-peer communications.

As smartphones continue to evolve, new models are starting to include Wi-Fi Direct support in addition to network Wi-Fi. In one preferred embodiment of the present disclosure, where a power control unit 200 and smartphone 10 exchange a Wi-Fi Direct intent as part of the discovery process, the smartphone 10 and power control unit 200 will negotiate which device will assume the role of group owner in accordance with the Wi-Fi Alliance Wi-Fi Direct specification, and a peer-to-peer Wi-Fi Direct communication link will be established. The Wi-Fi Direct specification allows any Wi-Fi Direct device to be a group owner, and depending on the capabilities of the device, the negotiation procedure determines the most suitable device to perform this role.

System microcontroller 208 preferably incorporates a firmware program which defines the operation and functions of power control unit 200 and assumes responsibility for running program code and system elements, including specifying and controlling the operation of wireless communications 202, interrogation of the perpetual clock calendar 204, control and interrogation of a sensor module 206, and operation of power control circuit 212. System microcontroller 208 preferably includes a non-volatile memory to store any program data. In some preferred embodiments, perpetual clock calendar 204 may be an embedded function of system microcontroller 208. In some preferred embodiments, non-volatile memory may be external to system microcontroller 208. In some preferred embodiments, more than one microcontroller may be used.

When power control unit 200 is manufactured, system microcontroller 208 preferably holds the firmware to operate power control unit 200 as a network Wi-Fi device and Wi-Fi Direct access point/group participant. When power is applied to power control unit for the first time, system microcontroller 208 preferably starts wireless communications and control module 202 in Wi-Fi Direct mode and begins transmitting discovery messages that can be detected by a smartphone within wireless range.

It can be appreciated that a power control unit operating as a Wi-Fi Direct access point/group participant can communicate directly with a smartphone without needing a Wi-Fi WLAN. Power control unit 200 preferably appears as a Wi-Fi access point if smartphone 10 is not using Wi-Fi Direct to communicate; or negotiates with smartphone 10 as to which device will assume a Wi-Fi Direct group owner role if smartphone 10 is using Wi-Fi Direct to communicate. The user is then able to establish a peer-to-peer communications link and send commands directly to the selected power control unit without the need for any other device.

In one preferred embodiment, wireless communications 202 in a peer-to-peer mode may be configured to preferably simulate a Wi-Fi access point or operate as a SoftAP without support for Wi-Fi Direct. In that case, a smartphone would preferably establish a peer-to-peer communications link with a power control unit as if connecting to a Wi-Fi access point, but could not negotiate with the power control unit a Wi-Fi Direct connection even if smartphone 10 supported Wi-Fi Direct.

A preferred method for configuring and controlling a power control unit is through a related Product App. Installation instructions for the Product App are preferably included with the power control unit. The Product App preferably adopts the same centralized app store installation methods common to all smartphone platforms.

The Product App may communicate with any mix of wireless elements and radio technologies that seamlessly provide the best communications link with a power control unit. The Product App preferably controls smartphone 10 wireless communications in order to initiate, search and establish a wireless communications link with a power control unit. The Product App may preferably display preconfigured and new power control units via graphical elements on smartphone touch screen 12.

When the Product App starts, it will preferably scan for power control units and identify any new power control units that need to be initially configured. At this point, if a wireless peer-to-peer connection has not already been established between the smartphone and a new power control unit, the Product App preferably allows the user to establish a wireless peer-to-peer connection with the desired power control unit and determine if it is: to continue operating in peer-to-peer mode and remain a Wi-Fi Direct access point/group participant or SoftAP only; to operate in network Wi-Fi mode and connect to a WLAN as a client and become a network Wi-Fi device; or, where supported by wireless communications 202, operate concurrently in peer-to-peer mode and network Wi-Fi mode.

In a situation where the smartphone operating system does not allow the Product App to control the smartphone wireless communications in order to establish a peer-to-peer link with a power control unit, the user may use any mechanism provided by the smartphone to establish a peer-to-peer communication link with a power control unit prior to starting the Product App.

If the user wants the new power control unit to run in a peer-to-peer mode, preferably utilizing Wi-Fi Direct, they preferably select this option in the Product App. The Product App then leads the user through a series of data inputs using the smartphone's touch screen 12 as a human interface. The Product App communicates with system microcontroller 208 and replaces the general parameters used for the initial connection to specific parameters which define the power control unit as a unique product. These may include: setting a unique encryption key so all data transfers between power control unit and the smartphone are protected; setting the power control unit name to a unique, easily recognisable identifier; and setting a password in the power control unit used to establish a secure link with a smartphone.

The Product App preferably maintains a record of these specific parameters in the smartphone memory for future identification of, and connection to, the configured power control unit.

Once the setup procedure is complete, the Product App preferably commands the power control unit firmware to "restart". When the applications firmware restarts, the power control unit will use the user specified data to populate and create its own unique identity. The smartphone which was used to set this identity will be able to automatically connect to that power control unit because the new specific parameters are known. Where the smartphone operating system allows, the Product App can then be used to preferably automatically establish a communications link with the power control unit each time the user selects that particular device in the Product App.

Once a power control unit has been configured, any other smartphone can only connect with it if the user knows the specific parameters that are now unique to that particular power control unit. If a second smartphone searches for Wi-Fi access points or Wi-Fi Direct devices, it will see the configured power control unit with the characteristic that it is "secure". To connect to it, the user will have to know the specific password allocated to that power control unit, otherwise it will not be able to establish a communications link. If the password is known and entered into the smartphone when requested, a communication link between the second smartphone and the power control unit will be established. The Product App is still preferably required to control the power control unit and this may have additional security measures depending on the nature of the application.

If, instead of configuring the newly installed power control unit in peer-to-peer mode, the user chooses it to operate in network Wi-Fi mode, this is selected as the required option and the Product App determines if there are one or more WLANs available for the power control unit to connect to as a client. The Product App requests the user to confirm the preferred network and asks the user to confirm and/or input any necessary network parameters such as the network password so the power control unit can connect to the WLAN as a client.

The Product App, via the smartphone, communicates with system microcontroller 208 and sets the parameters needed for the power control unit to establish itself as a network Wi-Fi device which may include any parameters that uniquely identify the power control unit on the network. When all of the appropriate parameters are known and updated, the Product App commands the power control unit to restart as a network Wi-Fi device. The power control unit then connects to the WLAN as a client and is accessible by the smartphone Product App via the WLAN access point. The power control unit running as a network Wi-Fi client can then be controlled by other smartphones on the same WLAN. In one preferred embodiment, it may be desirable for the power control unit to include additional security measures such as password protection, a socket layer with the Product App, or other measures to prevent the power control unit being controlled by other devices on the network without authorization.

Preferably, where the smartphone is configured to determine from a power control unit's wireless signal that the power control unit is a new wireless device that can be configured as a WLAN network client, the smartphone preferably allows a user to automatically input the necessary network parameters of a known WLAN network from the smartphone's memory into the power control unit wirelessly using a peer-to-peer communications link to automatically configure the power control unit as a network client of the known WLAN network. The smartphone may also preferably be able to determine from the power control unit's wireless signal a product identifier allowing the smartphone to automatically download the power control unit's related Product App from the appropriate app store.

Once a power control unit has been configured as a peer-to-peer device or a network Wi-Fi device, it preferably continues to operate in that mode even after it has been powered off and then on again. All of the specific operating parameters for each mode are preferably saved in the non-volatile memory and are retained if power is removed. When power is restored, system microcontroller 208 powers up in the same Wi-Fi mode that was running before power was removed, and the appropriate firmware and operating parameters are restored from non-volatile memory.

There are applications where a power control unit running concurrent peer-to-peer mode and network Wi-Fi mode is desirable. In this situation, the user via the Product App may preferably activate both modes, allowing either mode to be used. Equally, the user, via the Product App, can choose to disable one of the modes, or can change from peer-to-peer mode to network Wi-Fi mode, or vice versa, as desired.

Each time the Wi-Fi mode is changed, the parameters for the new mode are preferably retained by system microcontroller 208 in the event power is disconnected or lost. When power is restored, system microcontroller 208 powers up in the same Wi-Fi mode as previously operating before power was removed, and the appropriate operating parameters are restored from the non-volatile memory. Thus, system microcontroller 208 preferably is configured with an adapted default setting that can be restored from the non-volatile memory.

It is envisaged that there may be times when a power control unit may need to be completely reset. The Product App is preferably able to communicate with a power control unit and command it to re-initialise to the factory default configuration. In this case, all user-defined parameters that were loaded into the power control unit are lost and it is returned to its factory default state, ready to receive new user-defined parameters.

The power control unit may incorporate a human interface in the form of a switch(s), button(s), or a capacitive/proximity touch pad(s), which the user could use to cause power control unit to: perform a control function; re-initialise to the factory default configuration without the use of a smartphone or Product App; reboot the system; or assist in a Wi-Fi Protected Setup. If desired, the power control unit may be configured for operation without any manual inputs on the device itself.

Figure 3:
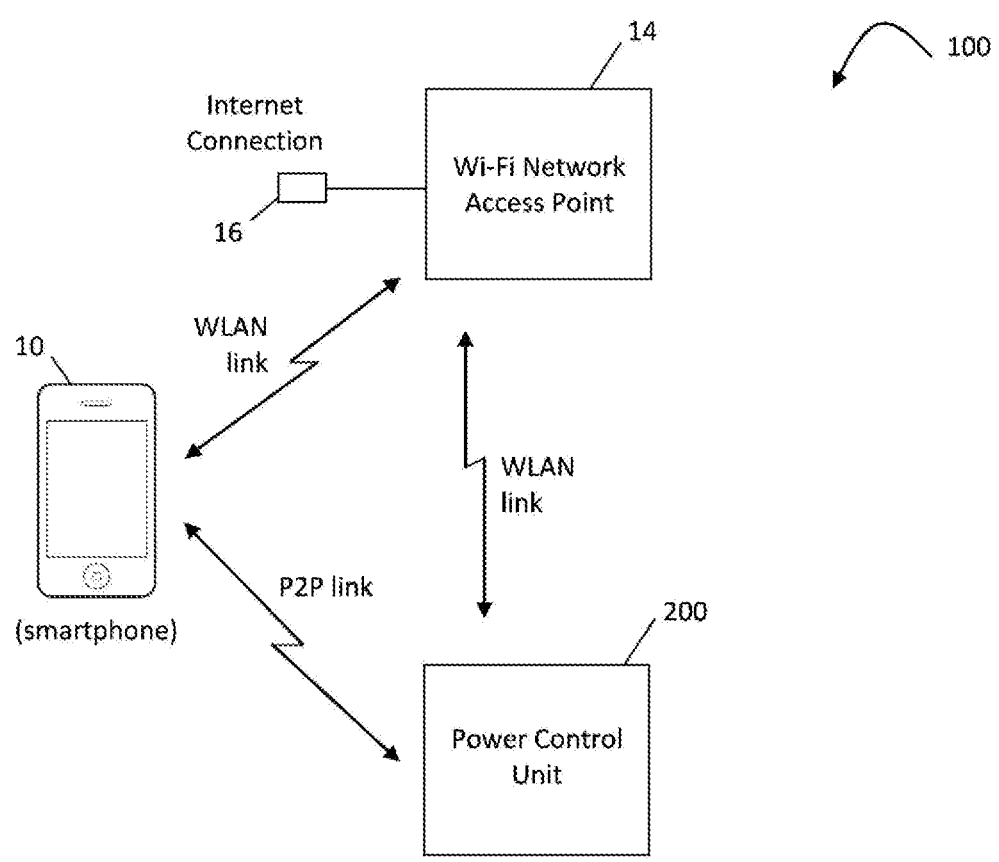
FIG. 3 is a system pictorial representation of the smartphone of FIG. 1 and the power control unit of FIG. 2 used in a peer-to-peer communications link with each other, and used in a Wi-Fi WLAN in accordance with one preferred embodiment of the present disclosure.

In one preferred embodiment, wireless communications 202 may include Bluetooth communication capabilities in addition to Wi-Fi Direct and network Wi-Fi capabilities. Referring to FIG. 3, a peer-to-peer Bluetooth communication link between smartphone 10 and power control unit 200 may be used by the Product App to enter parameters for establishing a Wi-Fi Direct or network Wi-Fi communications link, or open a Wi-Fi Direct or network Wi-Fi communications link, or may in its own right operate as a peer-to-peer communications link for exchange of data between the Product App and power control unit 200. The Product App, or a human interface on power control unit in the form of touch pad(s), button(s) or switch(s), may facilitate the establishment of a Bluetooth peer-to-peer connection between access administrator 200 and smartphone 10. The Product App may be configured to allow a user to specify Bluetooth as the preferred peer-to-peer communication method between a power control unit 200 and smartphone 10. The Bluetooth connection preferably utilizes the secure transmission methods and protocols native to the chosen Bluetooth standard.

Where smartphone 10 and power control unit 200 use a proprietary implementation of peer-to-peer Wi-Fi, or an adaptation of Wi-Fi Direct, the power control unit 200 and smartphone 10 are preferably configured to use the handshake, negotiation methods, protocols and configuration requirements particular to that proprietary implementation of peer-to-peer Wi-Fi or adaptation of Wi-Fi Direct and may incorporate any hardware, software, firmware or authentication schemes necessary, and may use Bluetooth to facilitate the process where supported.

In one preferred embodiment, the power control unit may include NFC capability that the Product App could use when first communicating with a new power control unit to automatically establish a Wi-Fi Direct, Bluetooth or other peer-to-peer communications link on smartphones that support NFC. This process is commonly referred to as "bootstrapping" and is an established method for initializing communications known by those skilled in the art.

Referring back to FIG. 2, the user can, using the Product App in its simplest form, command system microcontroller 208 to actuate power control circuits 212 to supply electrical power to electrical device 214 or disconnect electrical power to electrical device 214. The Product App is also preferably configured to be able to program power control unit 200 with more complex functions and scheduling. Programmed, time dependant operations are preferably executed by system microcontroller 208 as a timed sequence from a trigger event, such as a countdown timer, or as a specified task at a predetermined date and/or time of day for a single, continual or defined period. Single or multiple event start and stop times, selected day timers, repetition timers, weekly timers, combinational timers, specific date timers and many other functions are all possible and contemplated within the scope of the present disclosure.

The absolute time and date parameters of perpetual clock calendar 204 are preferably synchronized with smartphone 10 time and date parameters when a communications link is established.

Where electrical device 214 includes of a lighting element comprised of an array of segmented light emitting technologies, the intensity of light from the segmented light emitting technologies can preferably be separately and individually controlled by system microcontroller 208 and power control circuits 212.

In one preferred embodiment, electrical device 214 may include of a lighting element comprised of an array of coloured light emitting diodes (LED) capable of generating a spectrum of different colours through a process of colour mixing. Colour mixing typically involves generating a specific colour through varying the intensity or light output of a combination of red, green and blue LEDs. While the present disclosure anticipates the ability to use an array of coloured LEDs, it is not specifically limited to the use of red, green and blue LEDs, and may use any mixture of white and/or coloured light emitting technologies in order to achieve the desired colour mixing and spectrum capabilities.

In order for a user to choose or vary a colour, the Product App preferably provides a visual interface that represents an approximation of the spectrum of colours the lighting element is able to generate. Where user selects a colour in the Product App, the Product App preferably calculates the intensity of the component colours in the lighting element needed to deliver an approximation of the user's chosen colour at the current brightness level. Product App preferably commands system microcontroller 208 to vary power control circuits 212 to supply the necessary power to each component colour in the lighting element in order to generate a lighting colour closest representing the approximation chosen by the user in the Product App.

In one preferred embodiment, calculation of component colour mixing may preferably be handled by system microcontroller 208 or a dedicated mixing component in power control unit 200 rather than Product App.

In one preferred embodiment, power control unit 200 may include sensor module 206. As shown in FIG. 2, sensor module 206 preferably includes an ambient light sensor and a proximity sensor. Unless otherwise mentioned, sensor module 206 will be described as if including an ambient light sensor and a proximity detector, though the disclosure is not so limited.

It can be appreciated that the automation of a range of tasks can be greatly facilitated by the accurate measurement of ambient light and the setting of thresholds that system microcontroller 208 can use to determine if a trigger event has occurred in order to actuate power control circuit 212. By way of example only, this could be setting an ambient light level as a threshold for turning lights on and off at dusk and/or dawn.

A user through the Product App is preferably able to set an ambient light threshold that system microcontroller 208 can use as a trigger for executing an associated task. The ambient light threshold may be pre-stored in the Product App, or the Product App through a wireless communications link with power control unit 200 may request an immediate ambient light measurement from sensor module 206 to use as a threshold. Any ambient light levels set in the Product App as a threshold are preferably stored in the non-volatile memory of power control unit 200 and can be used by system microcontroller 208 to actuate power control circuit 212 when system microcontroller 208 determines that sensor module 206 is reporting the conditions matching a threshold for a trigger event.

System microcontroller 208 is preferably able to process multiple different thresholds, triggers, and sequencing which may be combined with time based modifiers; filters; and/or processes that could include those designed to reduce the likelihood of false positive conditions. By way of example only, system microcontroller 208 may be programmed by the Product App to actuate power control circuit 212 at a specified ambient light threshold. System microcontroller 208 preferably analyses measurements from sensor module 206 over a period of time to ensure the ambient light threshold has been met and is not being caused by an intermediate condition such as something temporarily covering sensor module 206. By way of another example, system microcontroller 208 may be programmed by the Product App to only use a threshold as a trigger event after a particular time of day. In that way, a user could set a power control unit to only use ambient light measurements after say 5 pm. By way of another example, where sensor module 206 includes spectral analysis capabilities, a threshold may be specified based on spectral analysis of an ambient light measurement. This is a form of filtering known by those skilled in the art that allows an ambient light threshold to be determined from the level of natural light without interference from artificial lighting. By way of another example, system microcontroller 208 may be programmed to turn power control circuit 212 on at a specified ambient light threshold and off at a different ambient light threshold with, or without, using a time based modifier. This could be by way of setting an actual time of day at which measurement for different thresholds occur, or a specifying a period of time after one threshold event that system microcontroller 208 starts scanning for the next threshold event.

In one preferred embodiment the sensor module is preferably a single integrated component, however in some embodiments it may be preferable to use a discrete ambient light sensor and/or a discrete proximity sensor. In some preferred embodiments, the proximity detector may be omitted and replaced with a button or switch. In some preferred embodiments, the ambient light sensor may be omitted. In one preferred embodiment, power control unit 200 may not include sensor module 206.

Where sensor module 206 is configured with a proximity sensor, the proximity sensor is preferably configured to initiate a task that may otherwise be performed by a mechanical or electro-mechanical switch. By way of example only, a power control unit 200 may be programmed by the Product App to monitor the proximity detector in sensor module 206 for a proximity event such as a user's hand approaching and/or touching power control unit 200 that system microcontroller 208 can use as a trigger to actuate power control circuit 212 in varying power to electrical device 214 as though a mechanical switch had been activated. A proximity event may be the detection of proximity less than a predetermined proximity threshold such as proximity within predetermined distance from the proximity detector. The predetermined distance may be configured as, for example only, anywhere within in a single room, hallway, corridor or open area within a building. The predetermined distance may be specifically calibrated for a range from the proximity detector, for example from 1 cm to 1 m, or more preferably between 0 cm to 15 cm. On detection of a proximity event, system microcontroller 208 may actuate power control circuit 212 to supply power to an electrical device 214 for a user defined period of time, say 30 mins. In that way a power control unit could be used to, for example, only activate a lamp at night for a set period of time when a user touches or is detected by the power control unit, thereby saving considerable power by not running the lighting continuously.

The management of power, light and automation it is often part of a broader energy conservation strategy. For that reason it may be desirable for power control unit 200 to only activate its wireless communications when a user wishes to establish a wireless communications link rather than have it run continuously drawing power. In one preferred embodiment, a user via the Product App may specify that the wireless communications and control module 202 only activate on the detection of a proximity event by sensor module 206. The proximity detector capability of sensor module 206 is preferably used to detect a user's hand in front of, and/or near and/or touching power control unit 200 and send a control signal to system microcontroller 208 that a proximity event has occurred. System microcontroller 208 on determining that a proximity event has occurred would preferably initialize wireless communications 202 to allow smartphone 10 to establish a wireless communications link. System microcontroller 208 would preferably only run wireless communications for a pre-defined active period after a proximity event and return wireless communications to a passive sleep state if a wireless communications link was not established during that period. If a wireless communications link was established during the pre-defined active period, system microcontroller 208 would preferably keep wireless communications active while the communications link was active, and return to a sleep state a short time after the communications link was terminated.

In one preferred embodiment, a physical button may be used to activate the wireless communications of power control unit 200 where a user wishes to establish a wireless communications link rather than have the wireless communications run continuously drawing power.

It can be appreciated that a number of sophisticated and complex automation and control schemes can be programmed into power control unit 200 by combining the processing capabilities of system microcontroller 208 with the timing capabilities of perpetual clock calendar 204 and sensing capabilities of sensor module 206.

In one preferred embodiment, power control circuits 212 may include a single semiconductor switch, or relay, or electro-mechanical relay configured to vary the supply of power to an electrical device 214 in a simple on/off fashion. In another preferred embodiment, power control circuits 212 may include a number of relays configured to vary the supply of power to different devices separately or grouped in a simple on/off fashion. In another preferred embodiment, power control circuits 212 may include any number and mix of semiconductor switches, mixers, relays, or electro-mechanical relays configured to vary the supply of power to individual components in a lighting element, or to various lighting elements. In another preferred embodiment, power control circuits 212 may include a dimming control or controls. A dimming control is used to vary the amount of power transferred to a lighting element, or a component of a lighting element, where they have the appropriate characteristics to allow the light output to be varied anywhere from fully on to fully off, or some intermediate range of light output if appropriate, as directed by system microcontroller 208. Using dimming in power control circuits 212 under the control of system microcontroller 208, the amount of electrical power transferred to a lighting element can be regulated. Because the electrical load presented to the dimming control can be resistive, inductive or capacitive depending on the light type and arrangement, the dimming unit can provide leading edge, trailing edge, pulse width modulation or other suitable methods of variable power control.

In one preferred embodiment, power control unit 200 may not contain any embedded power control circuits 212 and interface entirely with external power control circuits allowing for a custom number of circuits to meet the particular requirements of the application at hand.

Where power control unit 200 controls external power control circuits, it may do so through a physical connection (for example only, a wired connection) or may alternately use a wireless link. The use of a wireless extension may require the addition of a supporting radio to power control unit 200 that may be a transmitter, or a transceiver, depending on the requirements of the external power control circuits. The supporting radio may be configured by system microcontroller 208 to operate at a number of different carrier frequencies. Data could be modulated onto those carrier frequencies such that the encoded data could be received, decoded and acted upon by a compatible radio receiver or transceiver in a remote power control circuit configured to operate, or integrated into, devices such as, for example only, door mechanisms, gate mechanisms, motorized blind and awning mechanisms, motorized screen mechanisms, light switches, lighting controllers, lighting fixtures, lamps, luminaries, power control mechanisms, power outlets, fans, climate control equipment such as thermostats and air conditioning units, vending machines, sprinkler and watering systems, pumps, pool filtration systems, gas metering and control equipment, electricity meters, peripheral computer equipment, consumer electronics, whitegoods, and alarm systems.

The supporting radio may be capable of FSK, GFSK, MSK, OOK or other modulation methods and be able to operate over a wide frequency range including the license free Industrial Scientific and Medical (ISM) frequencies, or may support specific standards such as ZigBee, Z-wave, Thread or equivalent standards. While these specifications are applicable to most wireless sensor networks, home and building automation, alarm and security systems and industrial monitoring and control, there may be applications where a system compatible transceiver with specific frequency and modulation specifications is required. In these situations, a specific supporting radio could be provided within the embodiment described herein.

Where power control unit 200 is configured with a Bluetooth radio and controls external power control circuits, power control unit 200 and power control circuits may preferably communicate wirelessly utilizing Bluetooth, including the use of mesh enabled protocol layers such as CSRMesh.

It will be appreciated that the power control circuit 212 described above can be extended in many ways without departing from the scope of the present disclosure. Power control circuit 212 may be configured to control an external device such as a blind, fan, shutter, gate, door and lights, allowing power control unit 200 to manage a range of external devices according to programmed schedules and ambient light conditions where a sensor module is included.

While not shown, in one preferred embodiment it may be desirable for power control unit 200 to include a power measurement capability allowing the electrical parameters of the electricity transferred through power control circuit 212 to be measured. These parameters are available to system microcontroller 208 and may include instantaneous voltage, current and power, Irms and Vrms, average real and apparent power and energy-to-pulse conversion. Some or all of the measured electrical parameters could be sent to smartphone 10 via the communications link where the Product App would be able to perform additional calculations or conversions if required and display the results in a graphical format on the smartphone's touch sensitive screen for the user to view. Suitable processing of these parameters allows information such as the instantaneous power being used by an electrical device 214 to be displayed. Power usage over time, total power used and trend analysis are also some of the useful representations of the basic electrical data that are preferably measured and could be displayed to the user. By using the smartphone's Internet capability, the Product App could access a power company's rates and charges, and provide the user with usage and cost comparisons.

The inclusion of power measurement allows more advanced functionality other than simple metering to be offered by power control unit 200. In one preferred embodiment, system microcontroller 208 may continuously measure various electrical parameters through a power measurement circuit allowing system microcontroller 208 to detect possible error conditions in order to cause power control circuit 212 to reduce or cut power to an electrical device 214 to protect both power control unit 200 and the electrical device. In another preferred embodiment, system microcontroller 208 through a power measurement circuit may take a measurement of power control circuit 212 under operational load to establish a normal operating threshold. System microcontroller 208 could periodically or continuously monitor the power measurement circuit and report to the Product App any deviation from the operating threshold. By way of example only, this could be used to measure the operating load of a group of lights connected to power control circuit 212 and allow a user through the Product App to determine if any lights had blown based on the change in power being consumed rather than having to inspect each luminaire.

It will be appreciated by those skilled in the art that the system described above can be varied in many ways without departing from the scope of the present disclosure. By way of example only, elements of wireless communications 202, system microcontroller 208, and perpetual clock calendar 204 may be aggregated or separated into single components or various SoCs or SiPs. Sensor module 206 may be wired to power control device 200, or wirelessly connected. For example, a sensor module may be located in one portion of a room while the power control device is at another portion of the room. More than one sensor may be utilised. For example, ambient light sensors may be positioned in multiple rooms throughout a structure or building. Sensors other than light or proximity may be used. For example, motion, temperature and/or microphone may be utilised if desired. The sensor module may include any combination of light, proximity, motion, temperature and/or sound sensors.

FIG. 3 is a pictorial representation of system 100 showing an exemplary arrangement of smartphone 10, Wi-Fi WLAN access point 14, internet connection 16, power control unit 200 and the communications systems connecting each of the elements. Wi-Fi WLAN has an access point 14. Access point 14 has Internet connection 16. WLAN communications preferably pass through access point 14. Where power control unit 200 is configured to operate in network Wi-Fi mode, it preferably operates as a client of access point 14. For smartphone 10 to communicate with power control unit 200 running as a network Wi-Fi client, smartphone 10 must also preferably connect to access point 14 as a client. Messages from smartphone 10 could then pass through access point 14 to power control unit 200. If smartphone 10 were not in wireless range of access point 14, it may still be able to communicate with access point 14 via internet connection 16 if so configured. The communications between a smartphone and an access point through an Internet connection would be well understood by those of ordinary skill in the art.

In addition to, or instead of, operating in network Wi-Fi mode, power control unit 200 may be configured to operate in peer-to-peer mode preferably utilizing Wi-Fi Direct. In that instance, smartphone 10 can wirelessly connect directly to power control unit 200 peer-to-peer without requiring any other device. Accordingly, it can be seen that: (1) access point 14 is not required for peer-to-peer communications; (2) the communications link is formed on an "as needed" basis; and (3) that smartphone 10 needs to be within radio range of power control unit 200 to establish a direct communications link. Where desirable, a peer-to-peer connection between smartphone 10 and power control unit 200 could be by way of Bluetooth or by power control unit 200 simulating a Wi-Fi access point or operating as a SoftAP.

It can be appreciated that a network Wi-Fi connection and a Wi-Fi Direct connection offer a different mix of convenience and security. A power control unit operating as a network Wi-Fi device may be remotely controlled by a smartphone where access point 14 has an internet connection 16, however the power control unit then becomes exposed to the outside world and may be vulnerable to external threats such as hacking. Alternatively, a Wi-Fi Direct connection by virtue of its limited wireless range and peer-to-peer architecture offers a higher level of security. The balance between operational modes is usually subjective and dependant on the application at hand. In some instances infrastructure limitations such as the availability of a WLAN may further constrain operational modes.

Power control unit 200 may be configured to provide a received signal strength indicator, or received channel power indicator, of access point 14 which power control unit 200 may preferably report to the Product App for display on smartphone screen 12. A received signal strength indicator, or received channel power indicator, is a measurement of the power present in a received radio signal and allows a user to locate wireless products such as power control unit 200 close enough to access point 14 in order to ensure a sufficiently strong wireless signal exists between the two devices to provide the best environment for a stable and reliable communications link. The Product App also preferably displays on smartphone screen 12 a received signal strength indicator, or received channel power indicator, for power control unit 200 measured by smartphone 10.

If desired, power control unit 200 may be configured with a visual indicator capable of displaying a received signal strength indication for any wireless signal that power control unit 200 may be capable of measuring.

It can be appreciated that the adaptable nature of wireless communications 202 and its multi-mode peer-to-peer and network communications capabilities allow a power control device to be configured a number of different ways for communications with a smartphone with, or without, the use of a Wi-Fi network. By way of example, smartphone 10, power control unit 200 and Product App may be configured to preferably utilize only those communication pathway(s) that allow for control of a power control unit without smartphone 10 having to disconnect a WLAN connection with access point 14. In that way, power control unit 200 may also be configured as a client of access point 14, however it may not always be possible or desirable to configure power control unit 200 as a client of access point 14. In that instance, communications between smartphone 10 and power control unit 200 would need to utilize a peer-to-peer communication standard supported by power control unit 200 and smartphone 10. Where smartphone 10 supports concurrent Wi-Fi Direct and network Wi-Fi, power control unit 200 configured with Wi-Fi Direct and smartphone 10 could preferably form a Wi-Fi Direct communications link, allowing smartphone 10 to remain connected to access point 14 while concurrently connected peer-to-peer to power control unit 200. Where smartphone 10 does not support Wi-Fi Direct, power control unit 200 preferably appears as a Wi-Fi access point, however while it is not usually possible for a smartphone to conned to two access points at the same time, some smartphones are capable of connecting to an access point and a SoftAP or simulated access point at the same time so that smartphone 10 could remain connected to access point 14 and connect to power control unit 200 simulating a Wi-Fi access point or operating as a SoftAP. Where smartphone 10 cannot connect to access point 14 and a power control unit 200 simulating a Wi-Fi access point simultaneously, power control unit 200 may preferably be configured to communicate peer-to-peer with smartphone 10 using Bluetooth.

In one preferred embodiment, the Product App may preferably be able to use a smartphone's cellular or network Wi-Fi capabilities to exchange data with an external service provider in order to facilitate the remote control or interrogation of power control unit 200 through internet connection 16 and access point 14, where power control unit 200 operates as a network client of access point 14.

In a preferred form of the present disclosure, a communications link or mode utilising IEEE802.11 ad-hoc mode (as commonly understood by those of ordinary skill in the art) is hereby expressly excluded.

Figure 4:
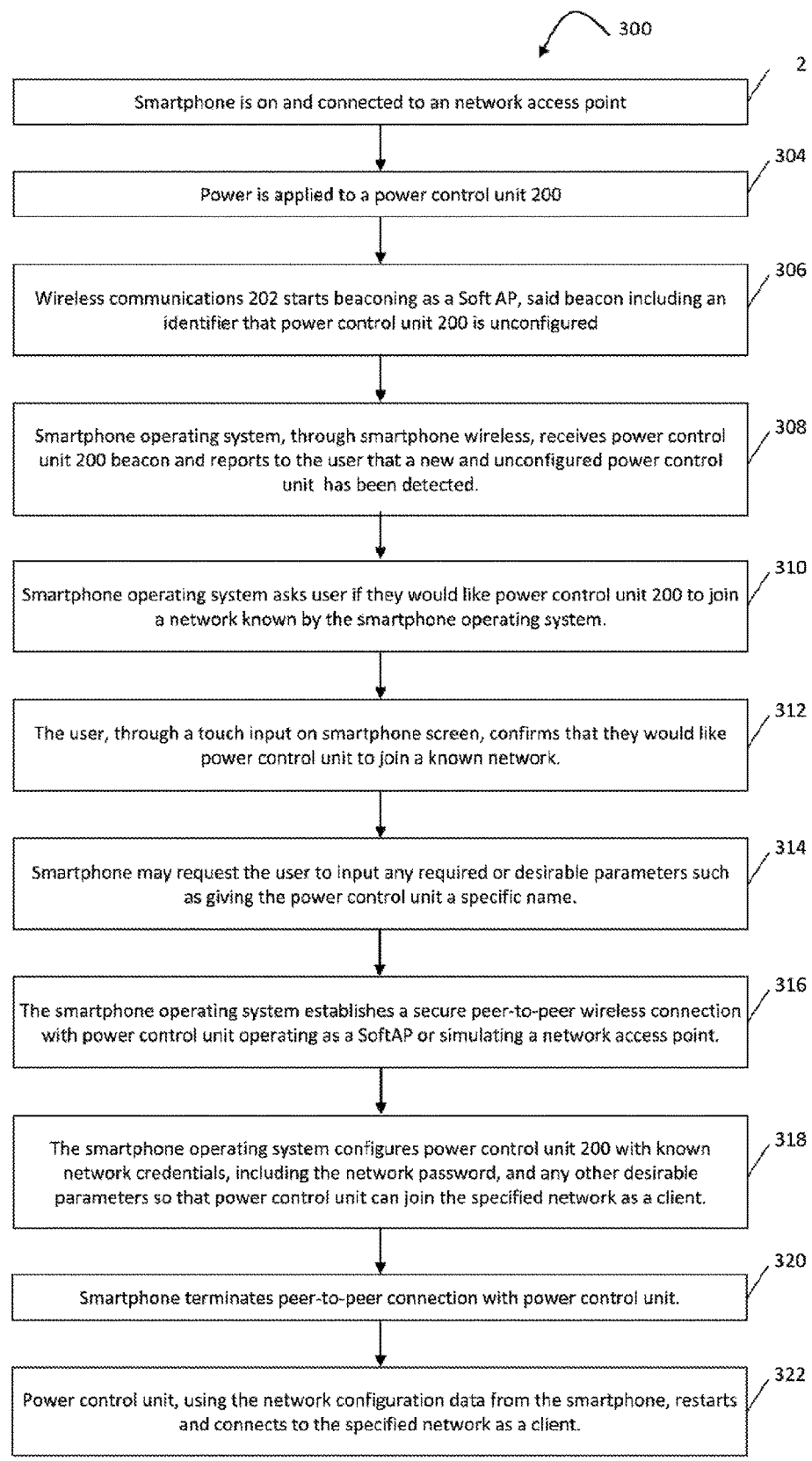
FIG. 4 is a flow diagram of an exemplary configuration procedure utilizing the smartphone of FIG. 1 to configure the power control unit of FIG. 2 as a client device in Wi-Fi WLAN of FIG. 3 in accordance with one preferred embodiment of the present disclosure.

Turning now to FIG. 4, an exemplary configuration procedure 300 is show for configuration of power control unit 200 as a network Wi-Fi device by smartphone 10 in a preferred embodiment of the present disclosure. While configuration procedure 300 has been described in relation to a smartphone operating system, configuration procedure 300 is not so limited and may be performed by the Product App where the Product App is able to control smartphone wireless communications as required.

At step 302, smartphone 10 is connected to a network access point, such as Wi-Fi network access point 14 in FIG. 3. At step 304 power is applied to power control unit 200 for the first time, allowing power control unit 200 to run all of its systems. At step 306, wireless communications module 202, configured to simulate a network access point or operate as a SoftAP, begins to wirelessly beacon its network information. The wireless beacon preferably includes an identifier that reports power control unit 200 as an unconfigured Wi-Fi network device to Wi-Fi devices configured to interpret the identifier. At step 308, the smartphone operating system through the smartphone's wireless transceiver, receives power control unit 200 beacon, determines from the identifier in the beacon that power control unit is an unconfigured power control unit and reports to the user via the smartphone touch screen that it has detected a new and unconfigured power control unit. At step 310, the smartphone operating system asks the user if they would like power control unit 200 to join a known network, preferably the network smartphone 10 is currently connected to. At step 312, the user through a touch input on the smartphone screen confirms they would like the unconfigured power control unit to join a network known by the smartphone operating system.

At step 314, smartphone operating system may require the user to enter a desirable or required parameter, such as a security code used in establishing a communications link between smartphone 10 and system microcontroller 208, or giving unconfigured power control unit 200 a specific name to be used during configuration as a network client. It can be appreciated that step 314 may be excluded where providing the quickest and easiest mechanism for configuration of a power control unit 200 by smartphone 10 as a network client of a network known by smartphone 10 is desirable, or where elements of step 314 may be performed after power control unit 200 is configured and connected to a network as a client, such as giving power control unit 200 a unique name.

At step 316, the smartphone operating system establishes a secure peer-to-peer wireless connection with power control unit 200 preferably configured to simulate a network access point or operate as a SoftAP. The opening of a secure peer-to-peer connection may include the utilization of authentication hardware, firmware or software integrated into power control unit 200 and smartphone 10, so that power control unit 200 may automatically establish a secure connection with smartphone 10 utilizing an authentication handshake without requiring the user to input any security credentials manually. It can be appreciated that where smartphone 10 is unable to support a simultaneous connection with a network access point and a device simulating a network access point or operating as a SoftAP, such as power control unit 200, smartphone 10 may disconnect from the network access point in order to establish a secure peer-to-peer connection with power control unit 200.

At step 318, the smartphone operating system configures power control unit 200 with the network credentials of a known network, including the network password, and any other desirable or necessary parameters so that power control unit 200 can join the specified network as a network Wi-Fi client device. At step 320, the smartphone operating system terminates the peer-to-peer connection with power control unit 200. If the smartphone operating system disconnected from a network access point in order to establish a peer-to-peer connection with power control unit 200 at step 316, the smartphone operating system preferably re-establishes a connection with the network access point. At step 322, power control unit 200, using the network configuration data from the smartphone operating system, configures itself according to the network parameters supplied as a network Wi-Fi device and connects to the specified network access point as a client device, after which power control unit 200 and smartphone 10 are preferably able to communicate with each other through the network access point.

In one preferred embodiment, it may be preferable for power control unit 200 and smartphone 10 to utilize Wi-Fi Direct in establishing a peer-to-peer connection in configuration procedure 300.

It will be appreciated that certain steps outlined in configuration procedure 300 may be modified, deleted or added without departing from the scope of the present disclosure. For example, configuration procedure 300 may be adapted for execution by the Product App rather than a smartphone operating system. By way of another example, the smartphone operating system may cause power control unit 200 to start its configuration procedure after confirmation by the power control unit that it has successfully received the network parameters from the smartphone, or system microcontroller 208 of power control unit 200 may terminate the peer-to-peer connection with the smartphone and start its configuration procedure after successfully receiving network parameters from the smartphone without the smartphone operating system needing to initialize the configuration process.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A device for linking a personal controller to a lighting element, the personal controller having a processor, a user interface, and a wireless communications transceiver, said device comprising:
   a wireless communications module operable for secure two-way wireless communication with the personal controller, said wireless communications module including an aerial, a first radio transceiver configured to communicate with the personal controller selectively using a non-peer-to-peer communications link and a peer-to-peer communications link established by simulating a network access point, and a second radio transceiver configured to communicate with the personal controller using a peer-to-peer communications link different to that of said first radio transceiver;
   a microcontroller configured to operate said wireless communications module in more than one mode, said microcontroller being configured to operate said wireless communications module in a first mode using a peer-to-peer communications standard, said microcontroller being configured to operate said wireless communications module in a second mode using a non-peer-to-peer communications standard, said microcontroller being programmed to use the first mode to communicate with the personal controller and receive network parameters of an available WLAN from the personal controller, said microcontroller being configured to use the network parameters of the available WLAN received from the personal controller to operate said wireless communications module in the second mode as a client on the WLAN; and
   a power control circuit configured to implement a command from said microcontroller to vary the supply of electricity to the lighting element based at least in part on instructions communicated from said personal controller.

2. The device of claim 1, wherein said wireless communications module includes a transceiver configured to communicate in the first and second modes concurrently.

3. The device of claim 1, wherein the lighting element includes a plurality of differently colored LEDs, said microcontroller being configured to separately vary power to at least two LEDs of the lighting element through said power control circuit to change a composite color being emitted from the lighting element.

4. The device of claim 1, wherein said microcontroller is configured to open a peer-to-peer wireless communication link with the personal controller using a SoftAP.

5. The device of claim 1, further comprising an interface connection for physically connecting said device to a mains power line, said interface connection including a terminal block configured for wiring directly into the mains power line.

6. The device of claim 1, wherein said first radio transceiver is configured to selectively communicate with the personal controller using Wi-Fi Direct and network Wi-Fi.

7. The device of claim 1, wherein said second radio transceiver is configured to communicate with the personal controller using Bluetooth.

8. The device of claim 1, wherein said microcontroller is configured to use a Bluetooth communications link with the personal controller to re-configure said device as a network Wi-Fi device and/or Wi-Fi Direct access point/group participant.

9. A device for linking a personal controller to a lighting element, the personal controller having a processor, a user interface, and a wireless communications transceiver, said device comprising:
   a wireless communications module operable for secure two-way wireless communication with the personal controller, said wireless communications module including an aerial, a first radio transceiver configured to communicate with the personal controller using a peer-to-peer communications link established by simulating a network access point, and a second radio transceiver configured to communicate with the personal controller using a peer-to-peer communications link different to that of said first radio transceiver;
   a microcontroller configured to obtain network parameters of a WLAN from the personal controller using the peer-to-peer communications link established between said wireless communications module and the personal controller, said microcontroller being programmed to operate said wireless communications module as a client of the WLAN based on the network parameters obtained from the personal controller through the peer-to-peer communications link; and
   a power control circuit configured to implement a command from said microcontroller to vary the supply of electricity to the lighting element based at least in part on instructions communicated from said personal controller.

10. The device of claim 9, wherein said microcontroller is configured to communicate to the personal controller a product identifier associated with said device to permit the personal controller to automatically download an applications program configured for use with said device.

11. The device of claim 9, wherein said microcontroller is configured to open a peer-to-peer wireless communication link with the personal controller using a SoftAP.

12. The device of claim 9, wherein said first radio transceiver is configure to selectively communicate with the personal controller using Wi-Fi Direct and network Wi-Fi.

13. The device of claim 9, wherein said second radio transceiver is configured to communicate with the personal controller using Bluetooth.

14. A method for linking a smartphone to a lighting element, the method comprising:
   providing a power control unit physically connectable to a power circuit configured to operate the lighting element, the power control unit including a microprocessor, a first radio transceiver operable for establishing a peer-to-peer communications link with the smartphone, and a second radio transceiver operable for establishing, with the smartphone, a peer-to-peer communications link different to that of the first radio transceiver;
   establishing a wireless peer-to-peer connection between the power control unit and the smartphone by operating the power control unit as a simulated access point;

determining, with the smartphone, whether the power control unit is configured as a client in a WLAN within range of the power control unit; and configuring the power control unit as a client of the WLAN if the power control unit is not already configured as a client.

15. The method of claim 14, wherein the peer-to-peer connection is established by the power control unit operating as a softAP.

16. The method of claim 14, further comprising determining if network access details of a WLAN identified as being within range of the power control unit are stored in the smartphone.

17. The method of claim 14, further comprising providing the power control unit with a network password to access a WLAN identified as being within range of the power control device if the network access details for the identified WLAN are stored in the smartphone.

18. The method of claim 14, further comprising using the same radio transceiver that was used to establish the peer-to-peer connection with the smartphone to access the WLAN using a non-peer-to-peer communications link.

19. The method of claim 14, wherein the first radio transceiver is configured to establish the peer-to-peer connection with the smartphone using Wi-Fi Direct.

* * * * *